United States Patent [19]

Craves et al.

[11] Patent Number: 5,073,326

[45] Date of Patent: Dec. 17, 1991

[54] APPARATUS AND METHOD FOR INJECTION MOLDING ARTICLES WITH SUB-SURFACE PORTIONS

[75] Inventors: Roderick M. Craves, Oxford; Franklyn J. Korany, Detroit; Mark J. Jacobson, New Hudson, all of Mich.

[73] Assignee: Prism Design & Engineering, Inc., Oxford, Mich.

[21] Appl. No.: 391,489

[22] Filed: Aug. 9, 1989

[51] Int. Cl.$^5$ .................. B29C 45/14; B29C 39/10
[52] U.S. Cl. .................. 264/278; 249/95; 425/117; 425/121; 425/127
[58] Field of Search .......... 425/DIG. 5, 577, 110, 425/116, 117, 121, 127; 249/152, 83, 85, 142, 161; 164/112, 332–334; 264/271.1, 275, 278, 272.11, 272.14, 272.15, 277; 269/217, 229, 231, 233

[56] References Cited

U.S. PATENT DOCUMENTS

| 435,959 | 9/1890 | Wirz | 164/332 |
|---|---|---|---|
| 1,157,420 | 10/1915 | Roberts | 425/519 |
| 1,298,373 | 3/1919 | Mott et al. | 164/333 |
| 1,507,303 | 9/1924 | Applebaum | 425/588 |
| 1,590,768 | 6/1926 | Mahoney | 425/521 |
| 1,857,289 | 5/1932 | Schwartz | 249/122 |
| 1,995,973 | 3/1935 | Ericksson | 164/332 |
| 2,222,755 | 11/1940 | Watson | 264/275 |
| 2,580,816 | 1/1952 | Morin | 264/297.2 |
| 2,677,855 | 5/1954 | Mallory | 264/277 |
| 2,873,482 | 2/1959 | Bridge et al. | 264/275 |
| 3,077,639 | 2/1963 | Siner et al. | 264/272.11 |
| 3,443,786 | 5/1969 | Bachner | 425/588 |
| 4,158,910 | 6/1979 | Hanas et al. | 264/297.2 |
| 4,206,799 | 6/1980 | McDonald | 425/577 |
| 4,304,032 | 12/1981 | MacMillan et al. | 264/271.1 |
| 4,314,960 | 2/1982 | Hass | 264/272.15 |
| 4,318,879 | 3/1982 | Gärtner | 264/275 |
| 4,383,819 | 5/1983 | Letica | 425/DIG. 5 |
| 4,470,786 | 9/1984 | Sano et al. | 425/125 |
| 4,481,380 | 11/1984 | Wood et al. | 264/272.18 |
| 4,502,660 | 3/1985 | Luther et al. | 249/152 |
| 4,533,312 | 8/1985 | von Holdt | 249/152 |
| 4,556,190 | 12/1985 | Smith | 264/272.15 |
| 4,653,718 | 3/1987 | Dickens | 249/95 |
| 4,695,421 | 9/1987 | Takeda | 264/318 |
| 4,731,014 | 3/1988 | von Holdt | 249/122 |
| 4,805,869 | 2/1989 | Saunders et al. | 264/297.2 |
| 4,867,412 | 9/1989 | Greune | 249/95 |

Primary Examiner—Willard Hoag
Attorney, Agent, or Firm—Basile Hanlon

[57] ABSTRACT

Method and apparatus are disclosed for injection molding an article having at least one sub-surface portion. The apparatus includes an article mold having at least one cavity with a wedge-receiving aperture and a wedge insertable within the wedge-receiving aperture for receiving the sub-surface portion of the article. The wedge is movable between a wedged position, wherein the wedge is firmly seated within the wedge-receiving aperture and an unwedged position, wherein the wedge is movable with respect to the article mold to free the sub-surface portion of the article when ejecting the article from the cavity. The sub-surface portion of the article can include a part to be held within the cavity during injection molding, or an injection molded portion of the article forming a normally die locked portion of the article. The apparatus can also include a multi-piece mold cavity removably engageable within aligned apertures of a separable mold base. The multi-piece mold cavity includes tapered sidewalls for self aligning engagement with the sidewalls of the apertures in the mold base. The multi-piece mold cavity is assembled into a single unit at an assembly station prior to insertion into one of the mold base apertures at a molding station, and after injection molding, the multi-piece mold cavity is ejected from the mold base prior to disassembly and ejection of the molded article at a disassembly/article ejection station.

38 Claims, 14 Drawing Sheets

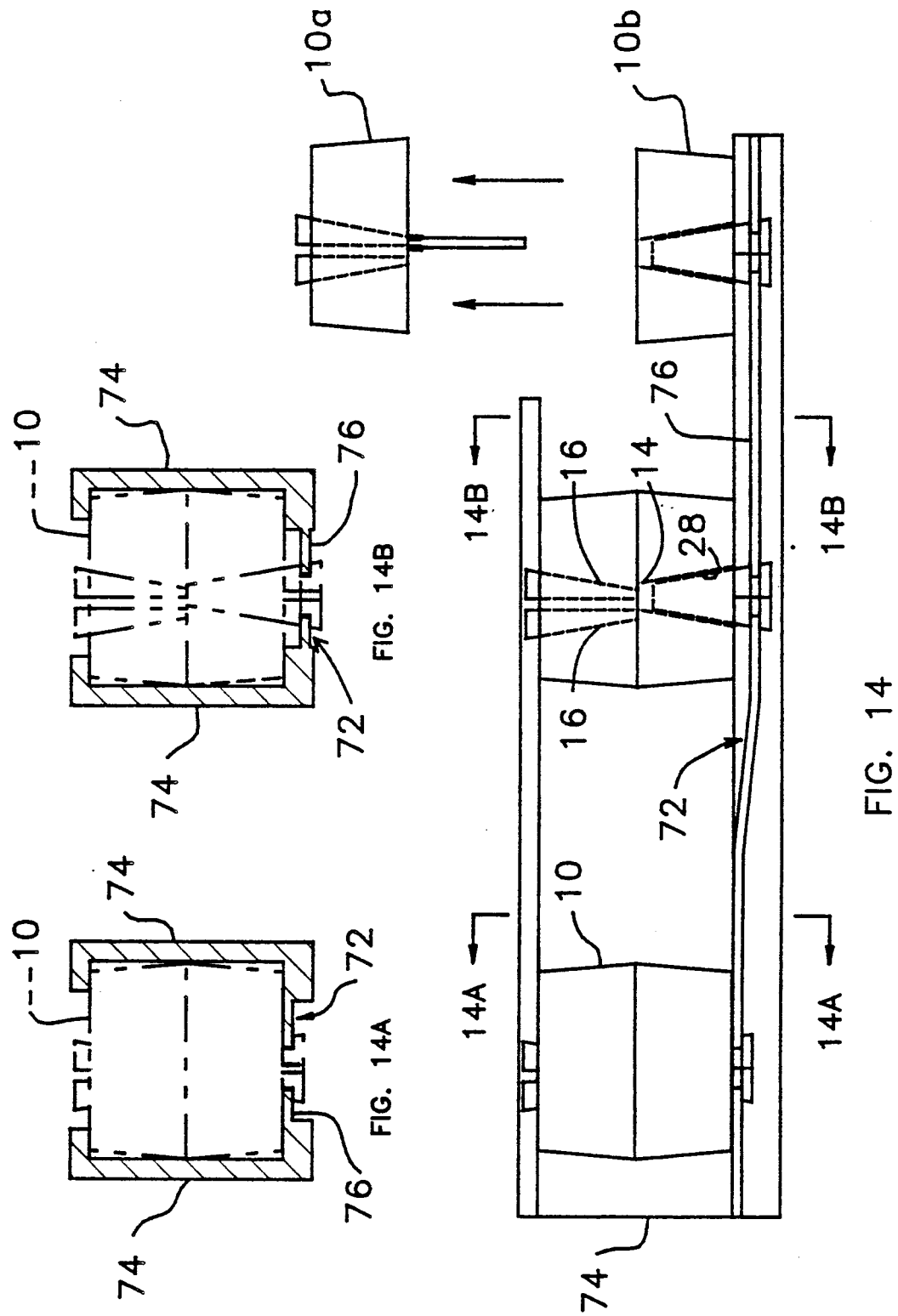

APPARATUS AND METHOD FOR INJECTION MOLDING ARTICLES WITH SUB-SURFACE PORTIONS

FIELD OF THE INVENTION

The present invention relates to an apparatus and method for plastic injection molding, and more particularly, to plastic injection molding articles with at least partially embedded parts and/or with sub-surface normally die locked portions.

BACKGROUND OF THE INVENTION

Previously, articles having partially embedded parts have been manufactured in two ways. The first method is a two-step process, in the first step the article is injection molded and then, in the second step, the electrical connectors are inserted straight through the molded article. Articles made by this method do not meet the high temperature operating requirements or terminal/connector retention requirements currently sought by automotive manufacturers. An example of this type of article, is a relay for use in an automotive electrical system. The second method uses shuttle molds, wherein an upper mold is disposed within the plastic injection molding machine, and two separate lower molds are mounted on a shuttle unit. The electrical connectors are inserted into one of the shuttle molds outside of the plastic injection molding machine. The mold with the electrical connectors is shuttled into the plastic molding machine, where the upper mold is moved into contact with the lower mold for subsequent injection of the plastic. The mold is opened and the articles are ejected. On completion of the loading of the electrical connectors into the other shuttle mold, the shuttle cycles to dispose the other mold within the plastic injection molding machine. This method of operation suffers from slow cycle time, thereby increasing the cost of articles being manufactured. In addition, misalignment of the electrical connectors or other imbedded parts can cause serious damage to the upper mold, thereby resulting in costly maintenance, reduced efficientcy, or complete shutdown in order to repair or replace the damaged components.

SUMMARY OF THE INVENTION

The present invention overcomes the disadvantages of the prior methods by providing a mold base having apertures disposed therein and a plurality of multi-piece removable molds with cavities in which the plastic is injected to form the article. The invention provides great flexibility in interchanging the articles to be molded within the mold base, since the multi-piece removable molds can be replaced with different removable molds having different cavity configurations within the individual apertures of the mold base. In addition, the present invention eliminates the potential damage to the mold cavities due to misalignment of the electrical connectors, or other parts to be embedded, since the multi-piece mold is properly aligned during assembly, prior to insertion into the mold base. Furthermore, the cycle time is decreased by providing a greater number of multi-piece removable molds with respect to the number of apertures within the mold base, thereby allowing sufficient time for the insertion of the electrical connectors by manual or automated means.

The invention includes a reciprocating injection molding machine with a stationary mold base, a reciprocal mold base, and a removable multi-piece mold cavity. The present invention can be modified for use in either horizontally or vertically reciprocating injection molding machines, and in an injection molding machine using a shuttle unit to move a pair of mold bases in and out of alignment with the reciprocating mold base. The mold base preferably includes a plurality of apertures. The side walls of the apertures are slightly tapered inwardly toward the bottom of the aperture to provide a self-aligning feature for the removable mold with respect to the mold base. In operation, the plastic injection mold is closed, which automatically self-aligns each removable multi-piece mold with respect to the mold base. Plastic is injected within the mold cavity to form an article. The plastic injection mold is then opened and each multi-piece mold is ejected and removed from the mold base. Each multi-piece mold is then disassembled and the plastic molded article is ejected from the cavity. Electrical connectors are loaded into one half of each mold cavity. The multi-piece mold is then reassembled with the electrical connectors disposed within the cavity and held by each half of the multi-piece mold. Each multi-piece mold is then loaded into one of the apertures in the mold base for subsequent injection molding. If one of the mold cavities does become damaged in some manner, it is easily replaced with another multi-piece removable mold at a lower cost than remanufacturing an entire mold base as has been the practice in the prior art. In addition, the articles being molded within the molding machine can be easily interchanged to meet flexible market demand requirements.

Another aspect of the invention relates to wedges which are incorporated into the multi-piece mold to hold the electrical connectors in place during the molding process. The electrical connector can be held in place between a one-piece wedge and a sidewall of a wedge-receiving aperture in the mold cavity. Similarly, an electrical connector can be held between two portions of a two-piece wedge, when the wedge is driven into a corresponding aperture in the mold cavity. A five-piece wedge is adapted to hold two electrical connectors having electrical contacts which must be held at a specified distance from one another while the article is being injection molded. The five-piece wedge includes a rectangular-shaped center post which holds the electrical contacts spaced from one another. The rectangular central post is disposed within a four-piece truncated pyramid-shaped wedge assembly. The T-shaped portion adjacent the base of the pyramid-shaped wedge pieces is used to draw the four-piece wedge out of engagement with the center post when releasing the molded article from the cavity.

Manufacturers using the shuttle mold plastic injection molding machines presently require a separate manufacturing step to weld the electrical contacts onto the electrical connectors after the molding process. The wedges used in the present invention facilitate easy insertion of the electrical connectors into the mold cavity, while holding the electrical connectors firmly during the injection molding process and allowing easy removal of the molded article from the mold cavity by the use of lifters and pullers engaging the wedges from the exterior of the mold cavity after the mold has been removed from the mold base.

Other advantages in the application of the present invention will become apparent to those skilled in the art when the following description of the best mold contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 14 is a side elevational view showing disassembly of a multi-piece injection mold cavity according to the present invention;

FIG. 14a is a cross section taken as shown in FIG. 14; and

FIG. 14b is a cross-section taken as shown in FIG. 14.

DESCRIPTION OF THE PREFERRED EMBODIMENT

The present invention concerns an apparatus and method for injection molding an article having sub-surface portions. The sub-surface portions can include parts, such as electrical connectors, electrical terminals or other non-injection molded elements, to be at least partially embedded in the article during injection molding. The sub-surface portions can also include portions of the article to be injection molded which extend below the cavity surface presenting a normal die lock condition. For purposes of illustration, the present invention will be described with reference to an injection molded automotive relay electrical connector. The following description is to be considered exemplary, rather than limiting, with a respect to the true scope of the invention.

Figure 1:
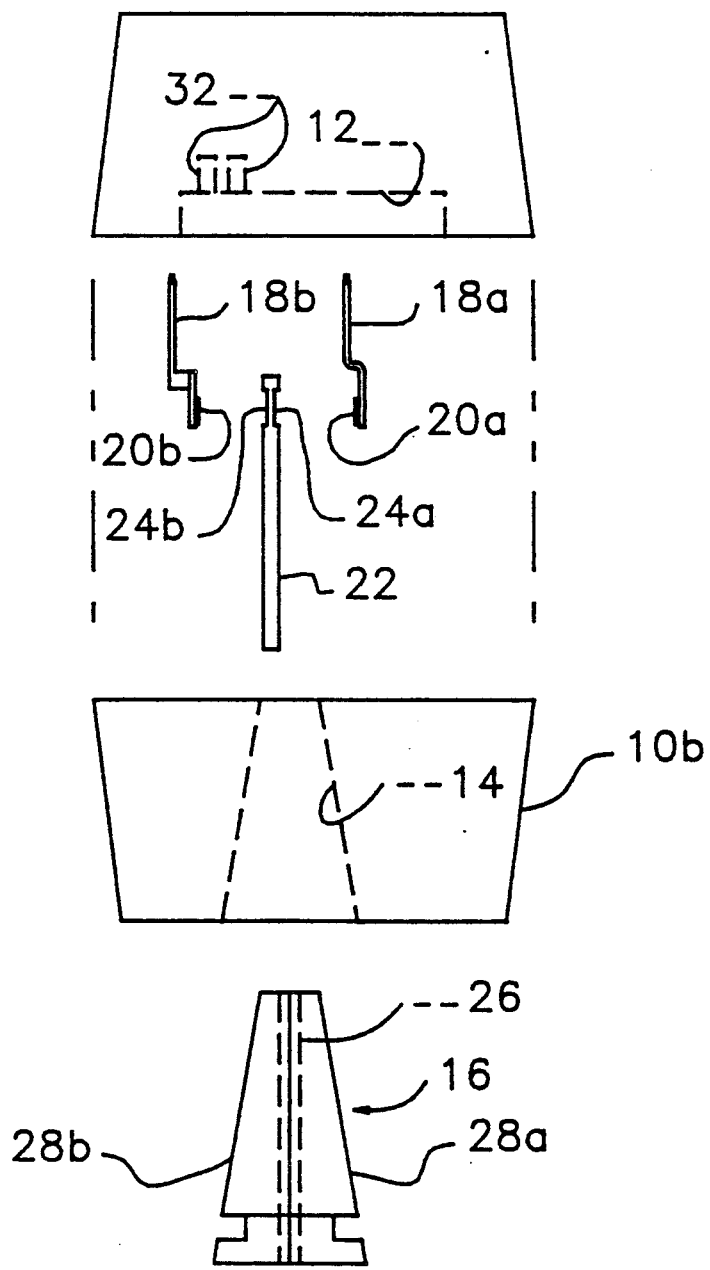
FIG. 1 is an exploded side view of a removable multipiece mold cavity with a five-piece wedge according to the present invention.

FIG. 1 shows an injection mold, designated generally 10, having an article cavity 12 with at least one wedge-receiving aperture 14. At least one wedge means 16 is disposed in the injection mold 10 for receiving at least one sub-surface portion of the article to be injection molded. The wedge means 16 is movable between a wedged position wherein the wedge means 16 is firmly seated within the wedge-receiving aperture 14, and an unwedged position wherein the wedge means 16 is movable with respect to the injection mold to free the at least one sub-surface article portion when ejecting the molded article from the article cavity 12. Wedge means 16 can be used to hold a pair of electrical connectors, 18a and 18b, with electrical contacts 20a and 20b held spaced apart from one another at a predetermined distance during injection molding of the article. The electrical contacts 20a and 20b are held in spaced apart relation by central post 22 which has contact-receiving apertures 24a and 24b. The central post 22 is engageable within an aperture 26 formed within the wedge means 16. In this particular configuration, the central post 22 forms part of a five-piece wedge means 16. The central post 22 is disposed within a four-piece truncated pyramid-shaped wedge assembly 28a–d. The T-shaped portion 30 adjacent the base the pyramid-shaped wedge pieces 28 is used to draw the four-piece wedge 28 out of engagement with the center post 22 when releasing the molded article from the injection mold 10. The opposite ends of the electrical connectors 18a and 18b are received within connector-receiving apertures 32. As can be seen in FIG. 1, the electrical connectors 18a and 18b are assembled with respect to the central post 22 and inserted from the parting line side of injection mold 10b. The four-piece wedge 28a–d is assembled into contact with the central post 22 from the opposite side of the injection mold 10b.

Figure 2:
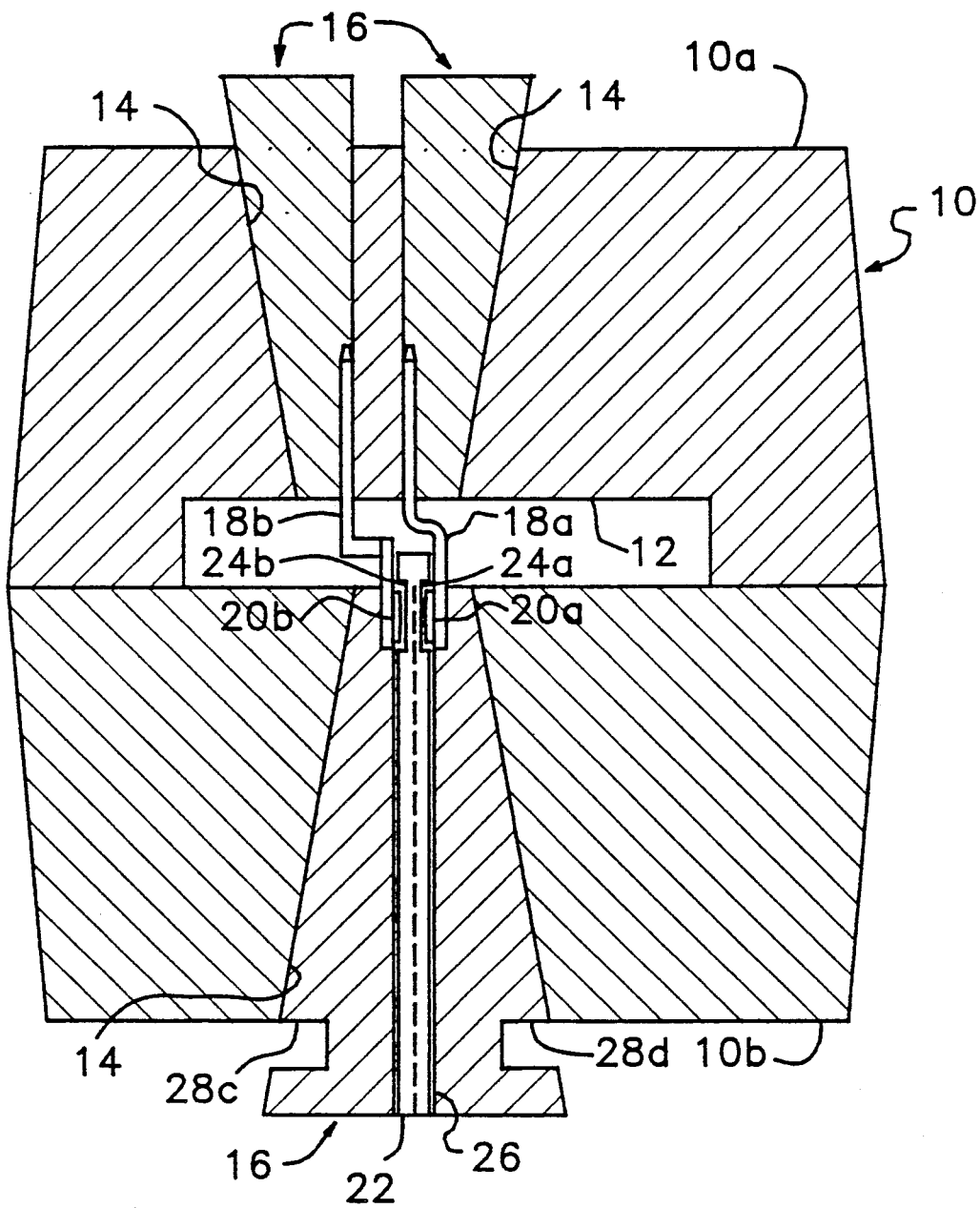
FIG. 2 is a cross-sectional side view of an assembled multi-piece mold cavity with one-piece wedges in one-half of the mold cavity and a five-piece wedge in another half of the mold cavity according to the present invention.

A slightly modified configuration of the injection mold 10 can be seen in FIG. 2. In the bottom portion of FIG. 2, the five-piece wedge defined by the central post 22 and the four piece wedge 28a–d is shown in an assembled wedged position. In the other half of the injection mold 10a, the connector-receiving apertures 32 have been formed by two single-piece wedge means 16. In this particular configuration, the single-piece wedge means 16 are seated within separate wedge-receiving apertures 14 formed in the mold half 10a. The single-piece wedge means 16 are shown in an assembled, wedged position for holding the electrical connectors 18a and 18b firmly in position during the injection molding process with the mold halves 10a and 10b in the closed position. The single-piece wedge means of this configuration are inserted from an opposite end of the mold half 10a from the parting line of the injection mold 10. This particular configuration is desirable when production tolerances of the parts to be at least partially embedded within the injection molded article require greater tolerances than that provided by the connector-receiving apertures 32 shown in FIG. 1. In addition, the single-piece wedges of this configuration provide easier assembly of the injection mold 10 and reduces the likelihood of damage to the article cavity 12 when assembling the parts within the injection mold 10.

Figure 3:
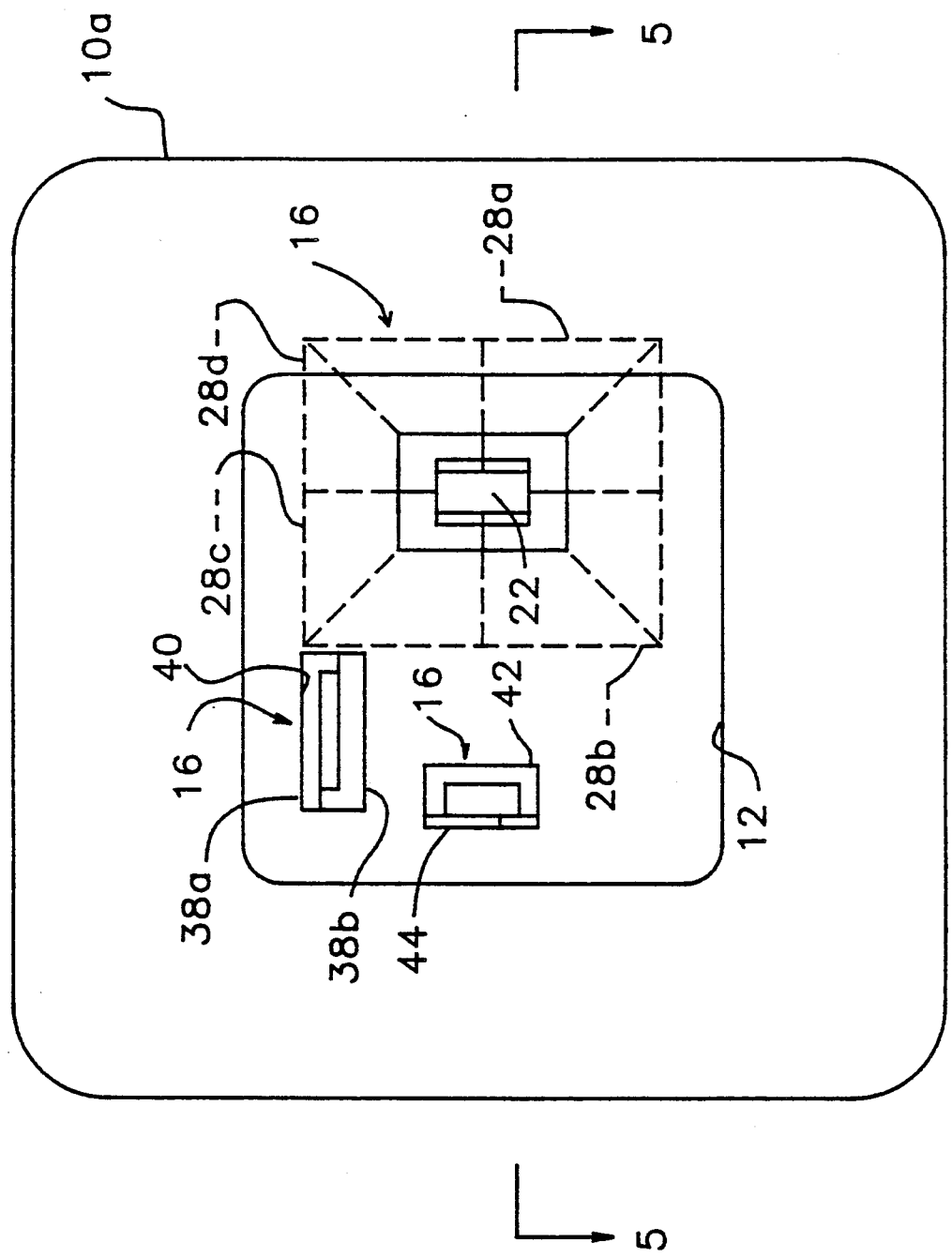
FIG. 3 is a plan view of one-half of a removable mold cavity having one-piece, two-piece, and five-piece wedges according to the present invention.

FIG. 3 shows a plan view of a slightly modified injection mold half 10a. In this embodiment, the injection mold 10a includes at least a portion of the article cavity 12 and three types of wedge means 16. One type of wedge means 16 includes the five-piece wedge previously described including the central post 22 and the four-piece truncated pyramid-shaped wedge 28a-d. A two-piece wedge means 16 is also shown including first and second wedge portions 38a and 38b. When assembled together, the first and second wedge portions 38a and 38b form a sub-surface aperture 40 which can be used for part engagement, or for forming sub-surface molded portions of the article. In this configuration, the two-piece wedge means 16 is assembled into the injection mold half 10a from the parting line side of the injection mold 10. The third type of wedge means 16 shown in FIG. 3 is a one-piece wedge 42. The one-piece wedge when placed in a wedged position within the injection mold 10 forms a sub-surface aperture 44 between the one piece wedge 42 and the wedge-receiving aperture 14. The sub-surface aperture 44 formed by the one-piece wedge 42 can be used for engaging a part to be partially embedded within the molded article, or can be used for forming a sub-surface portion of the injection molded part. In this configuration, the one-piece wedge 42 is assembled into a wedged position from the parting line side of the injection mold half 10a.

Figure 4:
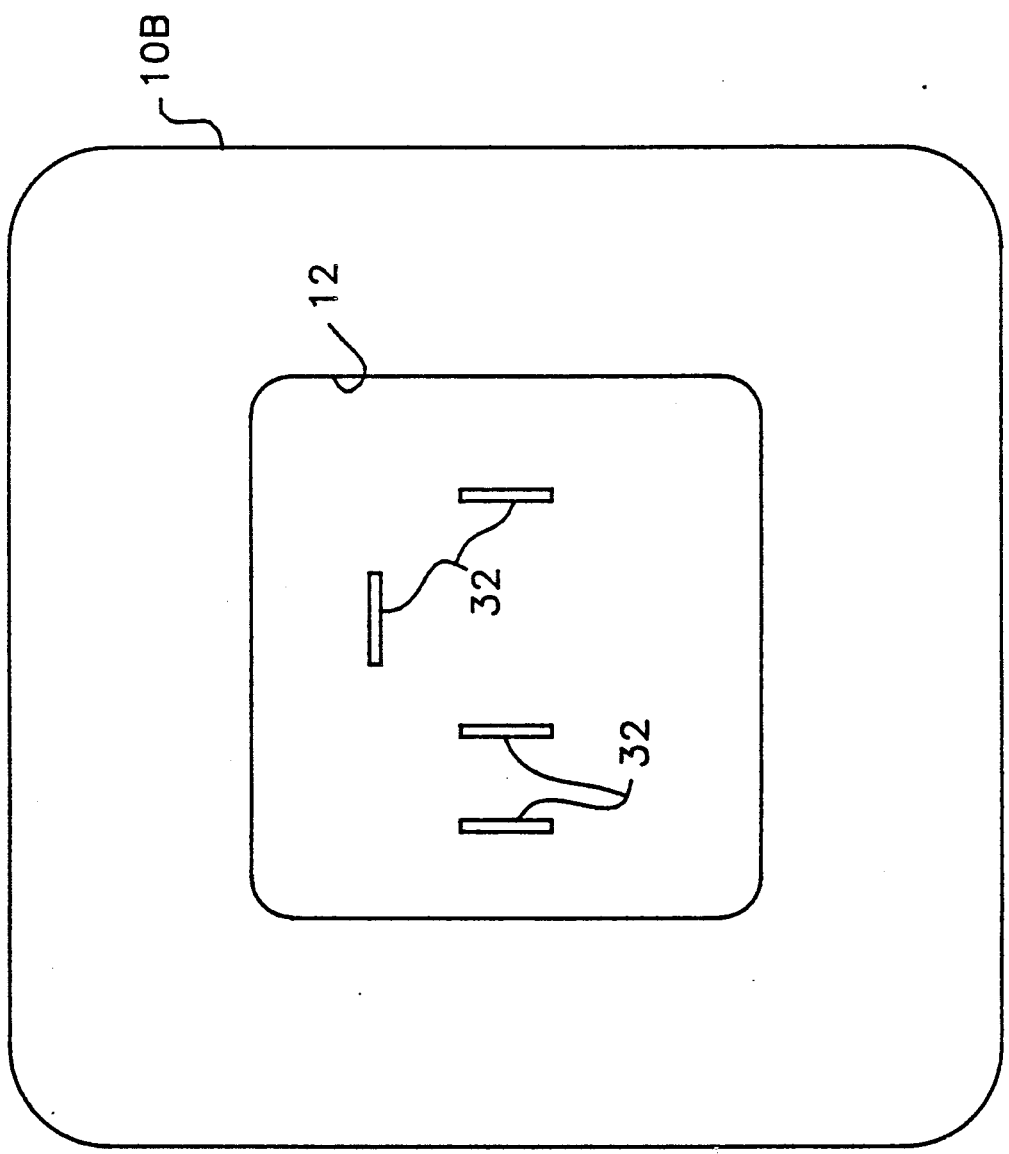
FIG. 4 is a plan view of another half of the multipiece mold cavity shown in FIG. 3 having slots for receiving portions of electrical connectors.

FIG. 4 is a plan view of the other half of the injection mold 10b. In this configuration, the mold half 10b includes at least a portion of the article cavity 12 and a plurality of connector-receiving apertures 32. It should be recognized by those skilled in the art, that the article cavity 12 can be formed as required in either half of the injection mold 10, or the article cavity 12 can be formed in a portion of both halves of the cavity mold 10 as shown in FIGS. 3 and 4.

Figure 5:
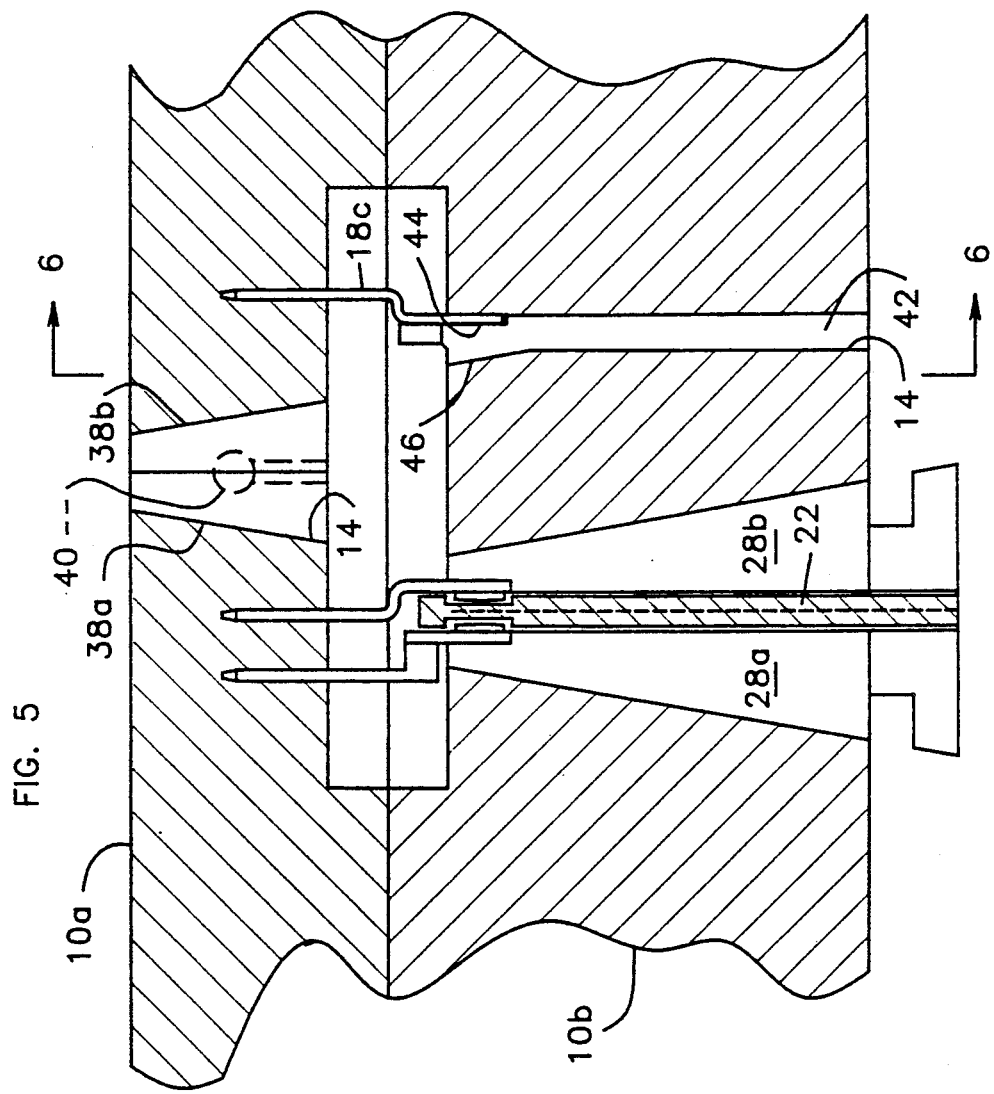
FIG. 5 is a cross-sectional side view of another mold cavity in an assembled condition taken as shown in FIG. 3.

FIG. 5 shows a cross sectional view of the first and second mold halves 10a and 10b in a closed position with the mold half 10b being slightly modified to include a two-piece wedge for forming a sub-surface injection molded portion of the article. The two-piece wedge 38a and 38b is disposed within a wedge-receiving aperture 14 in the injection mold half 10b. The two-piece wedge 38 forms a sub-surface aperture 40 to form an injection molded portion of the article. In previously known injection molds, the sub-surface aperture 40 would create a die lock condition preventing the molded article from being removed from the article cavity of the injection mold. By using wedges as taught in the present invention, the normal die lock condition can be avoided. The use of wedges for forming or holding sub-surface portions of the article increases the number of configurations of articles that can be injection molded in a cost efficient manner. It should be apparent to those skilled in the art that the present invention can be used to form a wide variety of configurations of sub-surface article portions which present normal die lock conditions, and is not meant to be limited to the configuration shown in FIG. 5. The one-piece wedge 42 is shown in a wedged position in the injection mold half 10a.

Figure 6:
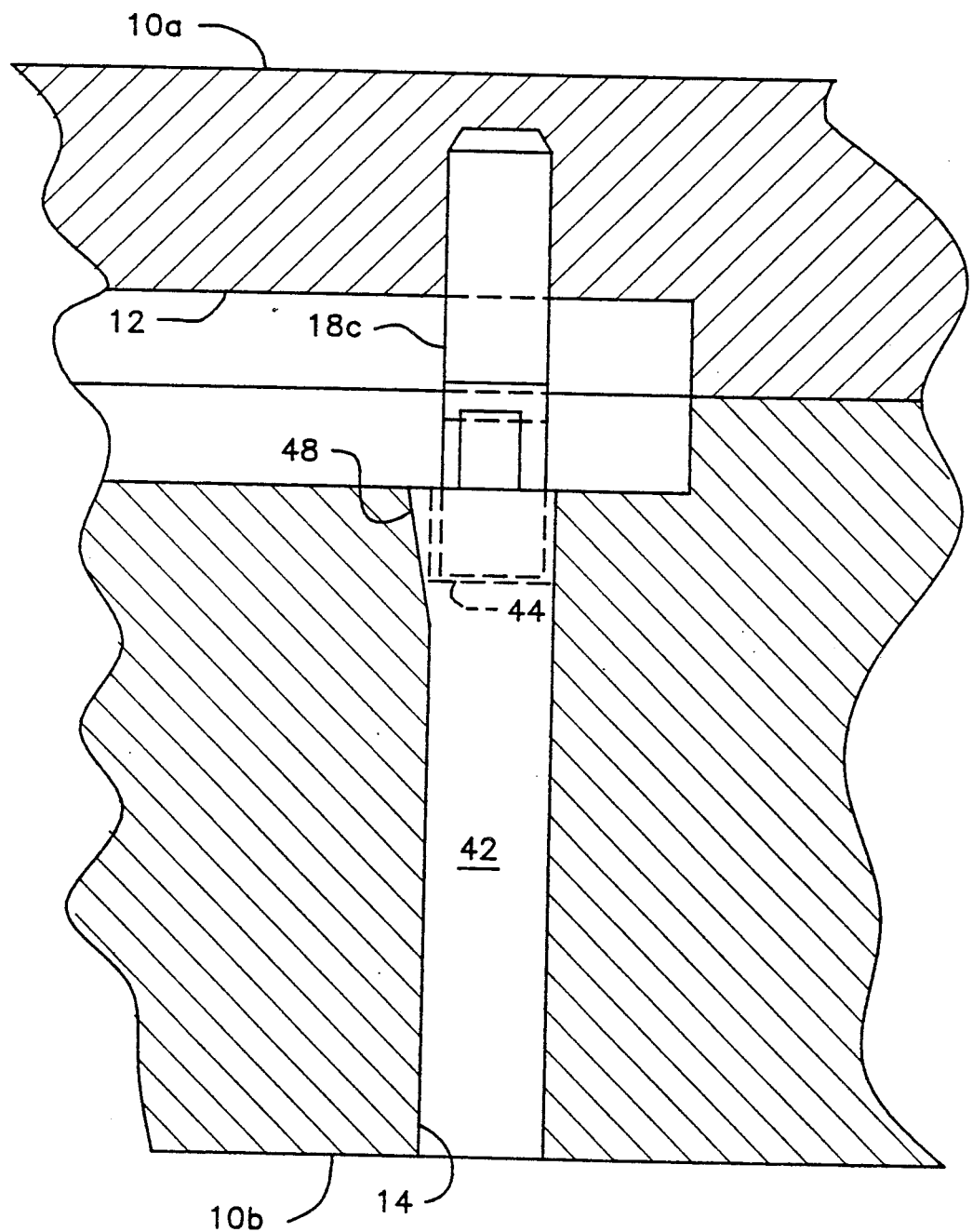
FIG. 6 is a cross-sectional side view taken as shown in FIG. 5.

Preferably, each wedge means 16 includes at least two angled surface portions engageable with corresponding complimentary angled surface portions of the wedge-receiving apertures 14 to accurately locate the sub-surface apertures when in a wedged position. Referring now to FIGS. 5 and 6, the one-piece wedge 42 is shown with a first angled portion 46 in FIG. 5 and a second angled portion 48 shown in FIG. 6. The one-piece wedge 42 in the configuration shown is used for holding an electrical connector 18c within the sub-surface aperture 34 formed by the one-piece wedge 42 adjacent the side wall of the wedge-receiving aperture 14.

Figure 7:
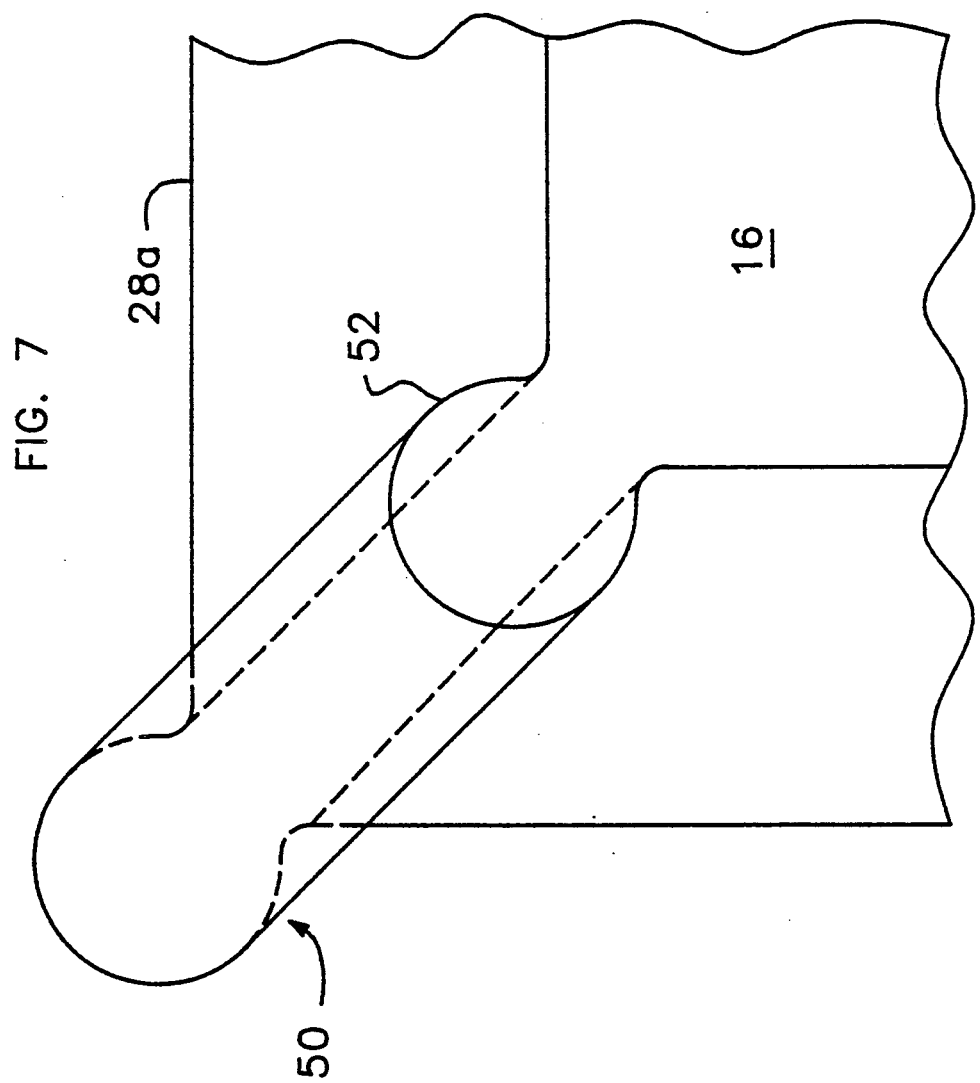
FIG. 7 is a detailed view of one corner of a wedge showing guide means for guiding the wedge during movement between a wedged position and an unwedged position.
Figure 8:
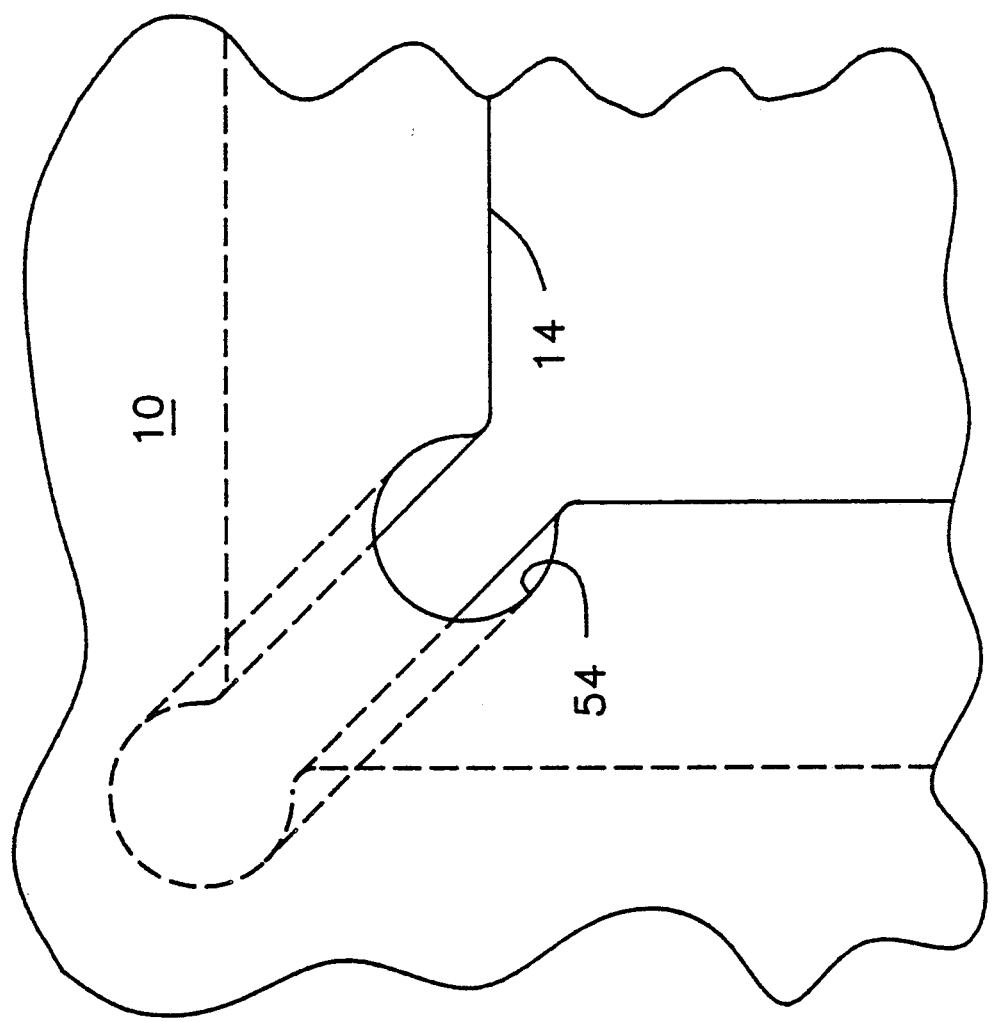
FIG. 8 is a detailed plan view of one corner of a wedge-receiving aperture forming part of the guide means for the wedge corner shown in FIG. 7.

FIG. 7 shows a detailed view of one corner of a wedge means 16. For illustration purposes, the corner depicted is of one of the four-piece wedges, such as 28a. The wedge means 16 can include guide means 50 for guiding the wedge means 16 along a fixed path of movement between a wedged position and an unwedged position. The guide means 50 can include guide member 52 disposed at a corner of the wedge means 16. Referring now to FIG. 8, a complimentary shaped slot 54 is formed in the wedge-receiving aperture 14 for slidingly engaging the guide member 52 of the wedge means 16. The guide means 50 is particularly useful for use in conjunction with multiple-piece wedges, such as the five-piece wedge. For example, when the four-piece truncated pyramid-shaped wedge members 28a-d are pulled back from the wedged position to an unwedged position, the members 28a-d have the tendency to move with relation to one another, which can make insertion of the central post 22 more difficult. By providing guide means at the four corners of the pyramid extending toward the parting line of the injection mold 10, each of the four pieces of the wedge assembly are held and guided along a fixed path to present a controlled, larger opening for insertion of the central post 22. Under certain circumstances, it may also be desirable to control the movement of single and/or multi-piece wedges during movement between the wedged and unwedged positions.

Figure 9:
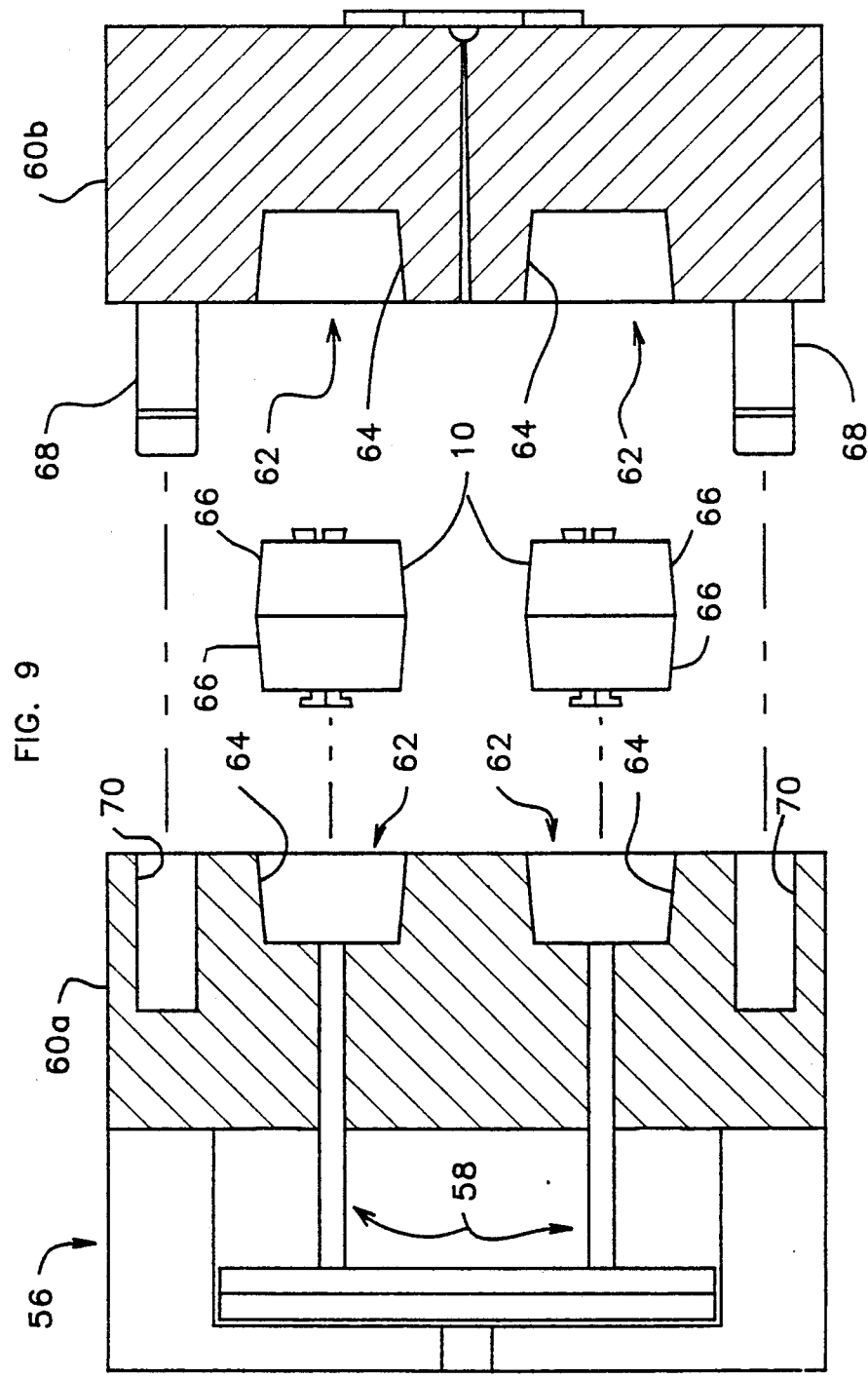
FIG. 9 is a partial cross-sectional side view of an injection molding machine having mold bases in an open position.
Figure 10:
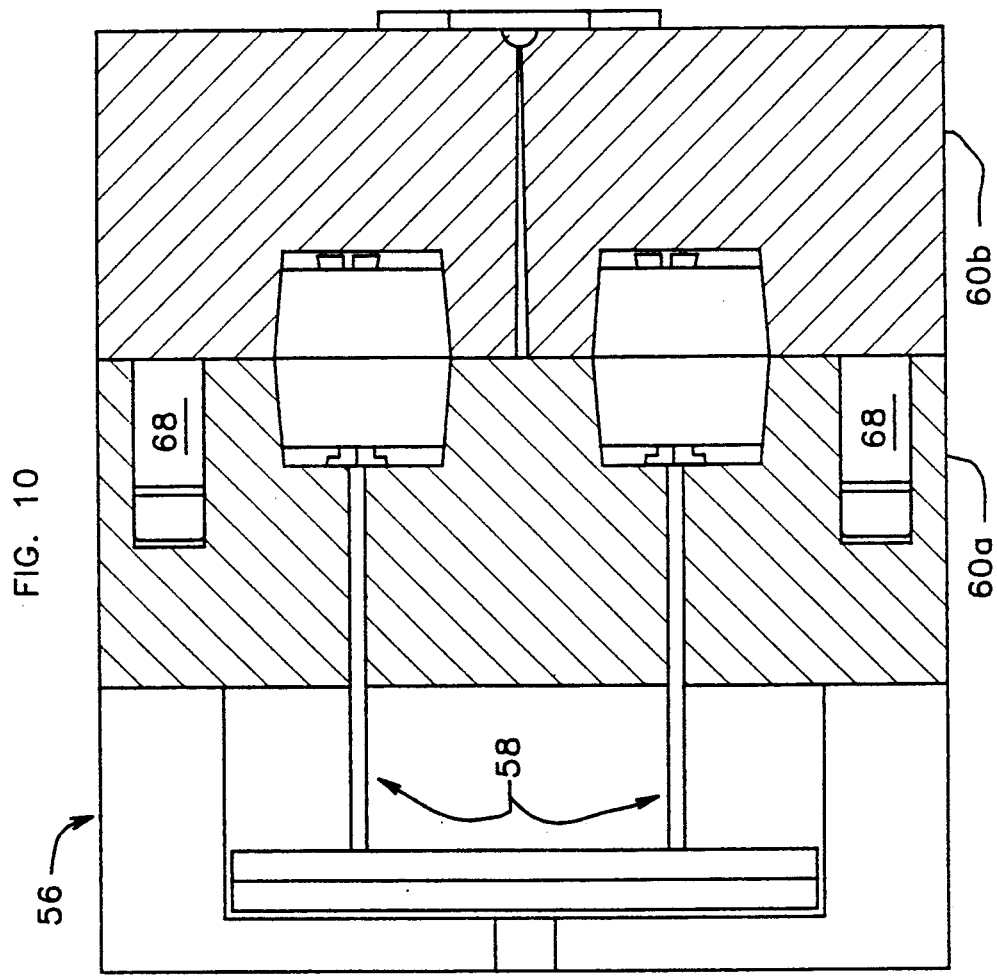
FIG. 10 is a partial cross-sectional view of an injection molding machine having mold bases in a closed position.
Figure 11:
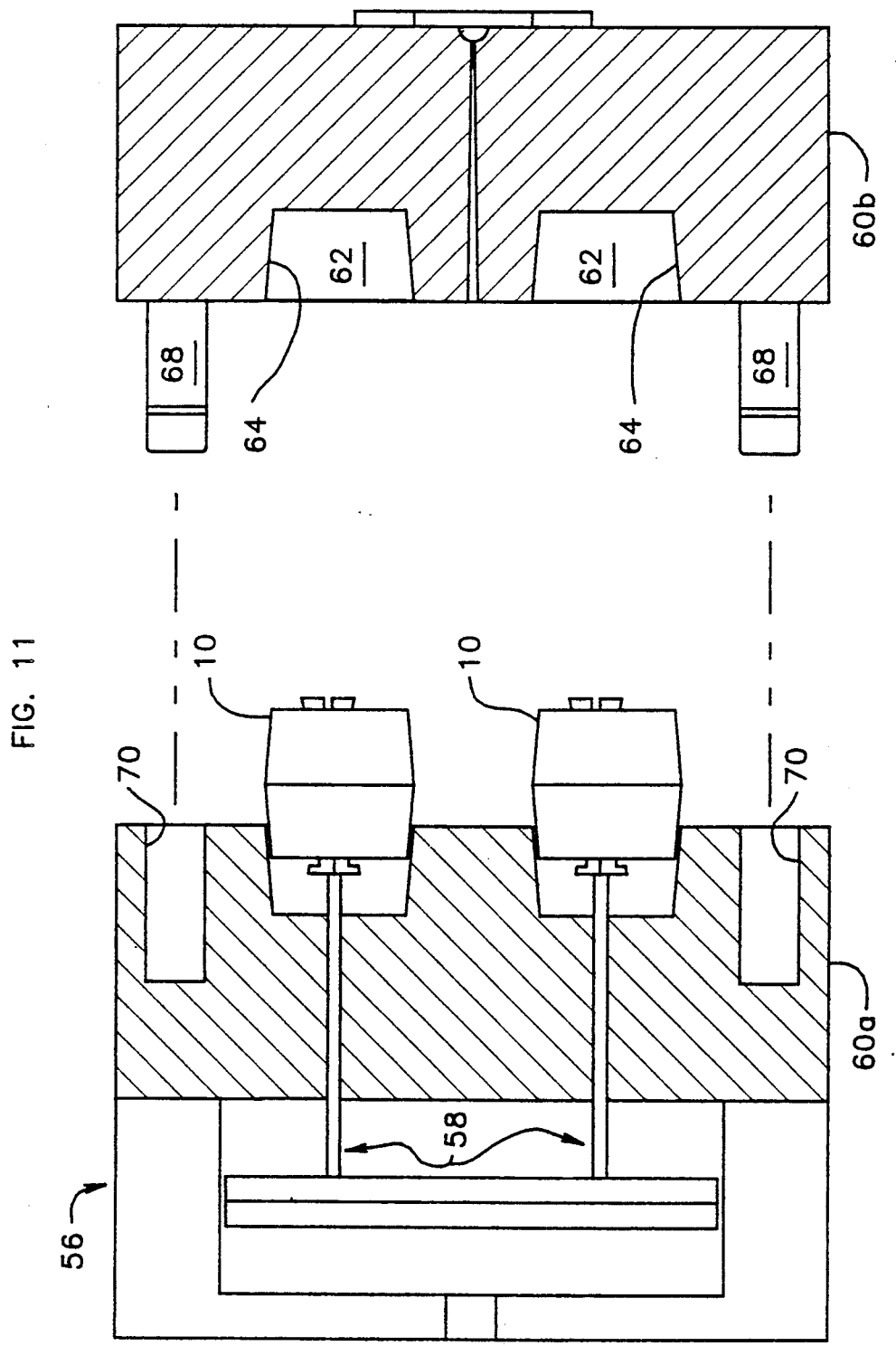
FIG. 11 is a partial cross-sectional view of an injection molding machine with multi-piece mold cavities being ejected from the mold base apertures.
Figure 12:
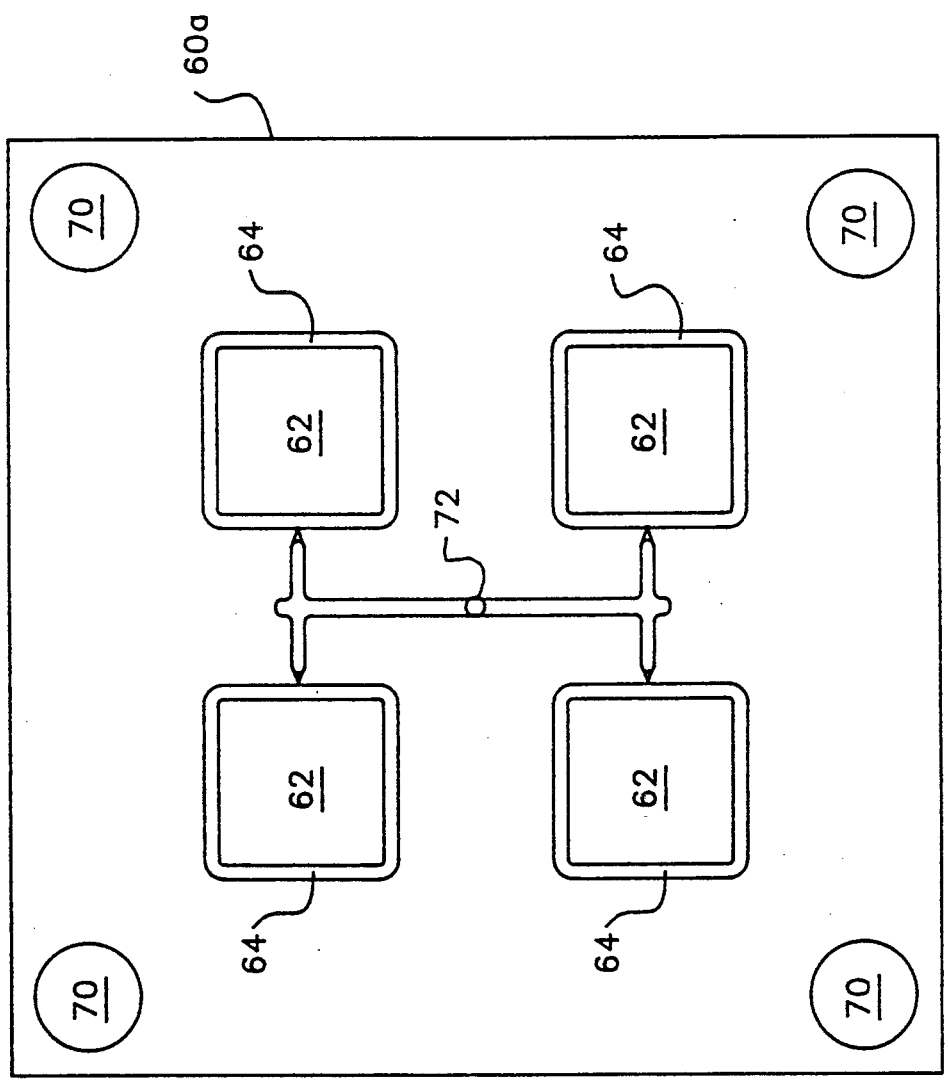
FIG. 12 is a plan view of one-half of the mold base.
Figure 13:
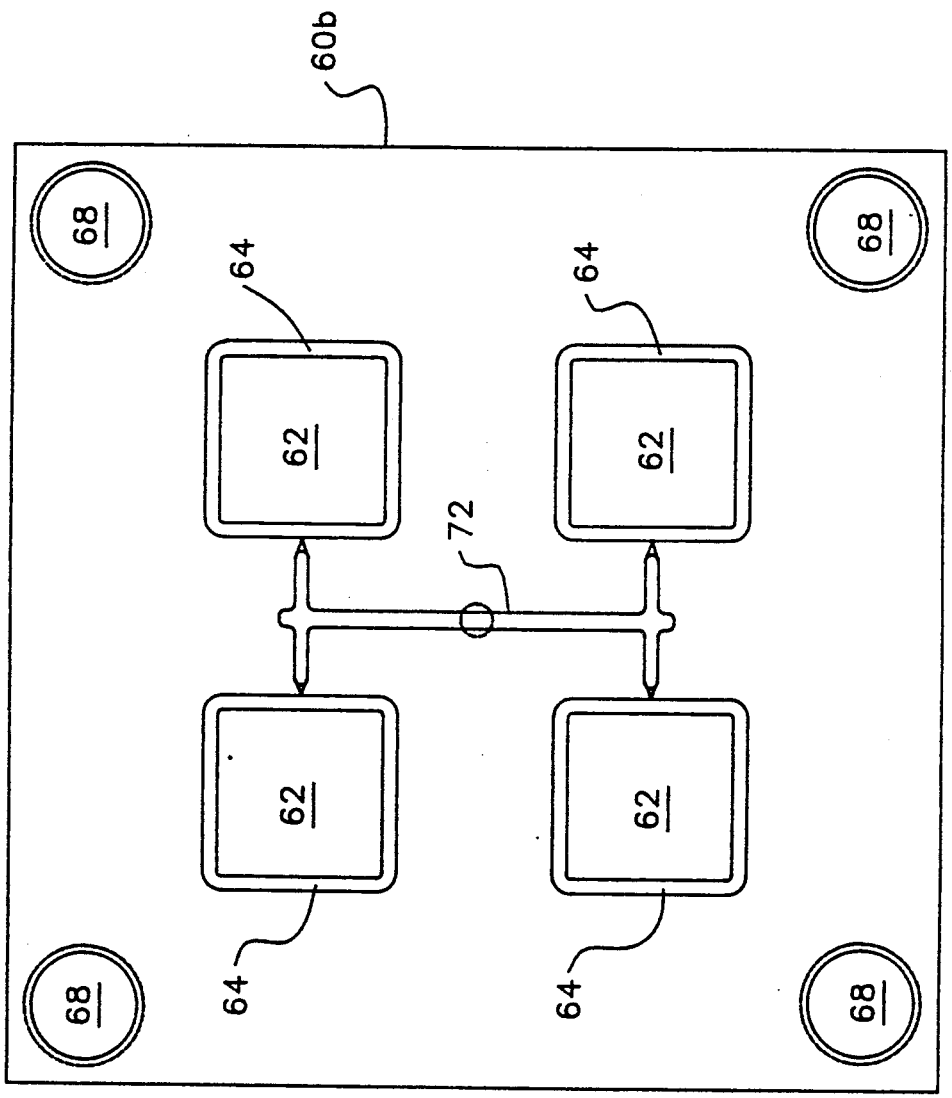
FIG. 13 is a plan view of the other half of the mold base.

Another aspect of the invention is illustrated in FIGS. 9-13. The present invention provides a plurality of removable, multi-piece injection molds 10. Each individual injection mold 10 defines a single unit when assembled, and includes at least one article cavity 12 disposed therein. A portion of a typical reciprocating injection molding machine, designated generally 56, with ejector pins 58 is shown in FIG. 9. The present invention includes first and second base molds 60a and 60b. Each base mold includes a plurality of injection mold-receiving apertures 62. Each aperture 62 includes tapered sidewall means 64 for self-aligning the injection mold with respect to the mold bases. Each injection mold 10 includes a complimentary tapered sidewall means 66 for engagement within the apertures 62 of the mold bases 60a and 60b. In operation, the multi-piece injection molds 10 are assembled at an assembling station. The assembled multi-piece injection molds 10 are then loaded into the apertures 62 of one of the mold bases. The injection molding machine 56 then sequences to mold the article within the injection mold cavity. The injection molding machine 56 closes the injection mold base 60 with the injection molds 10 interposed between the two mold base halves 60a and 60b, and with alignment pin 68 within alignment aperture 70. FIG. 10 shows the mold bases 60 in the closed position during the injection molding process. After the articles have been injection molded, the mold bases are separated and moved into an open spaced apart position. As shown in FIG. 11, the injection molds 10 are then ejected from one of the mold bases by ejector pins 58. The injection molds 10 are then unloaded from the mold base and transferred to a disassembling station, where the injection molds 10 are disassembled and the molded articles are ejected from the article cavities 12. After the injection molds are unloaded, and during disassembly of one set of molds, a second set of injection molds 10 can be simultaneously loaded into the mold base. The injection molding machine 56 can then be continuously operated while a first set of injection molds 10 are being assembled at the assembly station, a second set of injection molds 10 are within the mold base 60 for injection molding the article, and a third set of injection molds 10 are simultaneously being disassembled at the disassembling station. In addition, this configuration allows for great flexibility in the selection of the articles to be injection molded to meet flexible market demands, since the injection molds 10 can be interchanged rapidly and repeatedly with different injection molds 10 having cavities for different articles. Plan views of the two mold halves 60a and 60b can be seen in FIGS. 12 and 13 respectively. A supply passage 72 is formed in the mold base 60 at the parting line face. The supply passage 72 provides a passage for the plastic material to be injection molded into the article cavity 12 when the mold bases 60 are in a closed position. An aperture opening into the article cavity 12 is aligned with the supply passage 72 when the injection mold 10 is disposed within the mold base 60.

Referring now to FIG. 14, one possible configuration for a disassembling station is shown. The disassembling/article ejecting station includes wedge release means 72 for lifting and/or pulling wedges from the wedged position to an unwedged position. The wedge release means 72 in this configuration comprises a longitudinally extending fixture 74. The mold cavity 10 slides through the fixture 74. An outwardly extending flange 76 can engage with an exterior portion of the wedge means 16. The outwardly extending flange 76 can be angled away from the mold cavity 10 to pull a wedge means 16, such as the four-piece pyramid-shaped wedge assembly 28 out of engagement within the aperture 14. Of course, to disengage wedge means 16 which are inserted from the parting line side of the injection mold 10, ejector pins can be provided or a second outwardly extending flange can be provided which angles inwardly within a slot in the cavity mold to engage an outer portion of the wedge means 16 to push the wedge means 16 toward the parting line of the cavity mold 10. After releasing the wedge means 16 from the wedge-receiving aperture 14, the two mold halves 10a and 10b can be separated from one another and the molded article can be ejected from the article cavity 12.

When using the wedge means 16 in combination with the multi-piece removable mold cavities 10, it should be recognized that increased productivity and efficiency is accomplished due to ease of inserting parts within the mold cavity 10 and the continuous cycling of the injection molding machine 56 by use of multiple sets of removable injection molds 10. It should also be recognized that the present invention provides for insertion of the electrical connectors by manual or automated means. In addition, the loading and unloading of the removable mold cavities 10 into the mold base 60 can be accomplished by manual or automated means.

While the invention has been described in detail with reference to particular preferred embodiments, it will be apparent to those skilled in the art that the disclosed invention may be modified. Therefore, the foregoing disclosure is to be considered exemplary, rather than limiting, and the true scope of the invention is to be defined in the following claims.

What is claimed is:

1. A method for injection molding an article having a preform insert therein with a sub-surface portion comprising the steps of:

moving first and second die members of an injection mold reciprocally with respect to one another, said first and second die molds cooperatively defining an article cavity therebetween with at least one wedge-receiving aperture defined by a wall in one of said die members having at least one tapered sidewall extending from a surface defining said article cavity and an external surface of said die member;

operatively positioning at least one wedge member in said at least one wedge-receiving aperture formed in said injection mold for receiving at least one preform with a sub-surface portion;

sliding said at least one wedge member within said at least one wedge-receiving aperture and into engagement with said at least one tapered sidewall;

guiding said at least one wedge member during insertion into said die member and withdrawal from said die member with an elongated projection attached along a corner of said at least one wedge member cooperating with a corresponding recess in said die member;

locating said at least one sub-surface portion of said preform with a part extending externally of said article cavity held in at least one sub-surface part locating aperture defined by a surface on said at least one wedge member;

injection molding said article; and releasing said at least one wedge member to free said sub-surface portion of said preform while ejecting said article from said cavity.

2. The method of claim 1 wherein said sub-surface portion is a normally die locked portion of said article and further comprising the step of releasing said at least one wedge member to free said normally die locked portion of said article.

3. The method of claim 1 wherein said sub-surface article portion comprises a preform to be partially embedded within said article during injection molding and further comprising the step of positioning said at least one wedge member within said at least one wedge-receiving aperture to permit insertion of said preform into said injection mold and holding said preform within said article cavity with said at least one wedge member.

4. The method of claim 1 wherein said at least one wedge member comprises a one-piece wedge and further comprising the step of moving said one-piece wedge between a wedged position wherein said wedge is driven within said wedge-receiving aperture and an unwedged position wherein said wedge is movable with respect to said injection mold.

5. The method of claim 4 further comprising the step of holding a preform to be partially embedded within said article, and interposing said perform between said one-piece wedge and a sidewall of said wedge-receiving aperture.

6. The method of claim 1 wherein said at least one wedge member comprises a two piece wedge and further comprising the step of moving said two piece wedge between a wedged position wherein said wedge is driven within said wedge-receiving aperture and an unwedged position, wherein said wedge is moveable with respect to said injection mold.

7. The method of claim 6 further comprising the step of holding a preform to be partially embedded within said article, and interposing a portion of said preform between a first wedge member and second wedge member of said two piece wedge.

8. The method of claim 1 wherein said at least one wedge member comprises a multi-piece wedge and further comprising the step of inserting and removing one portion of said multi-piece wedge from one side of said one die member and engaging and disengaging a second portion of said multi-piece wedge from an opposite side of said one die member.

9. The method of claim 8 further comprising the steps of:
holding preforms to be partially embedded within said injection molded article at a predetermined spaced distance from one another with a central post comprising a first portion of said multi-piece wedge;
receiving said central post within a central aperture formed in a second portion of said multi-piece wedge, said second portion comprising a four-piece truncated pyramid shaped wedge assembly with a complimentary shaped central post receiving aperture and a T-shaped base; and
drawing the second portion out of engagement with the first portion when releasing said injection molded article from said cavity.

10. The method of claim 1 further comprising the step of:
holding said sub-surface portion of said preform within a close fitting aperture defined by an L-shaped portion of said at least one wedge member in cooperation with said die member.

11. A method for injection molding an article having a preform insert therein with a sub-surface portion, comprising the steps of:
assembling a first multi-piece mold into a first single unit at an assembly station;
said assembly step including the steps of:
inserting at least one preform into said first multi-piece mold;
wedgingly locating and holding said at least one preform in a desired position within said first multi-piece mold with at least one wedge member; and
guiding said at least one wedge member during insertion into said first multi-piece mold with an elongated projection attached along a corner of said at least one wedge member cooperating with a corresponding recess in said first multi-piece mold;
loading said first single unit into a complimentary shaped aperture in a first mold base of an injection molding machine at a molding station, wherein a second mold base is disposed in a spaced relationship to said first mold base when in an open position;
moving said first and second mold bases with respect to one another into a closed position such that said first single unit is disposed within said first and second mold bases when in a closed position;
injection molding said article within said first multi-piece mold disposed within said first and second mold bases;
moving said first and second mold bases with respect to one another into an open position;
ejecting said first single unit from one of said mold bases; and
disassembling said multi-piece mold at a disassembly/article ejection station;
said disassembling step including the steps of:
guiding said at least one wedge member during withdrawal from said first multi-piece mold with said elongated projection attached along said corner of said at least one wedge member cooperating with a corresponding recess in said first multi-piece mold;
releasing said at least one preform as said at least one wedge member withdraws from said first multi-piece mold; and
ejecting said injection molded article at said disassembly/article ejection station.

12. The method of claim 11 further comprising the steps of:
assembling a second multi-piece mold into a second single unit at said assembly station while said first single unit is injection molded.

13. The method of claim 12 further comprising the steps of:
disassembling a third multi-piece mold and ejecting said injection molded article while said second single unit is assembled.

14. The method of claim 12 further comprising the step of forming identical articles with said first and second multi-piece molds.

15. The method of claim 12 further comprising the step of forming different articles with said first and second multi-piece molds.

16. The method of claim 11 further comprising the steps of:
positioning a wedge in said first multi-piece mold at said assembly station for receiving a sub-surface article portion;
releasing said wedge in said first multi-piece mold at said disassembly/article ejecting station to free said sub-surface article portion while ejecting said injection molded article from said mold.

17. The method of claim 16 further comprising the step of partially embedding a preform within said article during injection molding, wherein said preform comprises said sub-surface article portion.

18. The method of claim 11 further comprising the step of loading a plurality of multi-piece molds into a corresponding plurality of complimentary shaped apertures in said first mold base.

19. The method of claim 11 further comprising the step of:
holding said sub-surface portion of said preform within a close fitting aperture defined by an L-shaped portion of said at least one wedge member in cooperation with said multi-piece mold.

20. An apparatus for injection molding an article having a preform insert therein with a sub-surface portion comprising:
an injection mold including first and second die members cooperatively defining an article cavity therebetween with at least one wedge-receiving aperture defined by a wall in one of said die members having at least one tapered sidewall extending from a surface defining said article cavity and an external surface of said die member;
at least one wedge member insertable within said wedge-receiving aperture for receiving said sub-surface portion of said preform, said at least one wedge member movable between a wedged position wherein said wedge member is firmly seated within said wedge receiving aperture and an unwedged position wherein said wedge member is movable with respect to said injection mold to free said sub-surface portion of said preform when ejecting said article from said injection mold, said at least one wedge member having an elongated projection attached along a corner cooperating with a corresponding recess in said die member so as to guide said at least one wedge member as inserted into said die member and withdrawn from said die member; and means defining at least one preform locating aperture formed in said at least one wedge member, such that said sub-surface portion of said preform extending externally of said article cavity is located with respect to said article cavity when said wedge member is in a wedged position, with said preform extending internally within said article cavity formed between said first and second die members.

21. The apparatus of claim 20 wherein said sub-surface portion of said article includes a normally die locked portion of said article and moving said at least one wedge member toward said unwedged position frees said normally die locked portion.

22. The apparatus of claim 20 wherein said wedge member is positionable to hold a preform within said article cavity driving injection molding such that said preform is partially embedded within said article after injection molding.

23. The apparatus of claim 20 wherein said sub-surface portion of said article comprises an injection molded portion of said article forming a normally die locked portion and said at least one wedge member is movable from the wedged position to the unwedged position to free the sub-surface die locked portion of said article.

24. The apparatus of claim 20, wherein said at least one wedge member comprises a multi-piece wedge wherein a first portion of said multi-piece is inserted and removed from one side of said injection mold and a second portion of said multi-piece wedge is engaged and disengaged from an opposite side of said injection mold.

25. The apparatus of claim 24 wherein said multi-piece wedge comprises a five piece wedge wherein said first portion includes a central post to hold two preforms to be partially embedded within said injection molded article at a predetermined spaced distance from one another and said second portion includes a four-piece truncated pyramid shaped wedge assembly with a complimentary shaped central post receiving aperture and a T-shaped base for drawing the second portion out of engagement with the first portion when releasing said injection molded article from said injection mold.

26. The apparatus of claim 20 wherein said at least one wedge member comprises a multi-piece wedge engageable within said wedge-receiving aperture from a first side of said injection mold to receive said sub-surface portion of said preform between separate portions of said multi-piece wedge.

27. The apparatus of claim 20 wherein said at least one wedge member comprises a one-piece wedge engageable within said wedge-receiving aperture from a first side of said injection mold to receive said sub-surface portion of said preform between said one-piece wedge and a wall of said wedge-receiving aperture.

28. The apparatus of claim 20 further comprising:
a reciprocal injection molding machine located at a molding station and having a first mold base and a second mold base separable along a parting line, said first and second mold bases moveable between a first open position wherein said first and second mold bases are spaced from one another, and a second closed position wherein said first and second mold bases are in abutting relationship with one another along said parting line, each mold base having at least one aperture with sidewall means tapering inwardly away from said parting line such that said aperture is largest at said parting line; and wherein said injection mold further comprises a multi-piece mold assembly removably engageable within said apertures of said first and second mold bases, said multi-piece mold assembly having complimentary tapered sidewall means for self-aligning engagement with said sidewall means of said apertures, wherein said multi-piece mold assembly is assembled into a single unit at an assembly station prior to insertion into one of said mold base apertures at said molding station, and wherein after injection molding said multi-piece mold assembly is ejected from one of said mold bases prior to disassembly and ejection of a molded article at a disassembly/article ejection station.

29. The apparatus of claim 20 further comprising:
said at least one wedge member having an L-shaped portion cooperating with said die member to form a close fitting aperture to receive said sub-surface portion of said preform.

30. An apparatus for injection molding an article having a preform with a sub-surface portion comprising:
a reciprocal injection molding machine located at a molding station and having a first mold base and a second mold base separable along a parting line, said first and second mold bases moveable between a first open position wherein said first and second mold bases are spaced from one another, and a second closed position wherein said first and second mold bases are in abutting relationship with one another along said parting line, each mold base having a surface defining at least one aperture with sidewall means tapering inwardly away from said parting line such that said aperture is largest at said parting line; and a multi-piece mold removably engageable within said apertures of said first and second mold bases, said multi-piece mold having complimentary tapered sidewall means for self-aligning engagement with said sidewall means of said apertures, said multi-piece mold including first and second die members cooperatively defining an article cavity therebetween with at least one wedge receiving aperture defined by a wall in one of said die members having at least one tapered sidewall extending from a surface defining said article cavity and an external surface of said die member, at least one wedge member engagable within said at least one wedge receiving aperture, guide means for guiding said at least one wedge member along a fixed path of movement between wedged and unwedged positions within said at least one wedge receiving aperture, said guide means including an elongated projection attached along a corner of said at least one wedge member cooperating with a corresponding recess in said die member so as to guide said at least one wedge member as said at least one wedge member is inserted into said die member and withdrawn from said die member, means defining at least one preform locating aperture formed in said at least one wedge member for receiving said sub-surface portion of said preform, such that said sub-surface portion of said preform is located and held with respect to said die member by said at least one wedge member when in said wedged position, wherein said multi-piece mold is assembled into a single unit at an assembly station prior to insertion into one of said mold base apertures at said molding station, and wherein after injection molding said multi-piece mold is ejected from one of said mold bases prior to disassembly and ejection of a molded article at a disassembly/article ejection station.

31. The apparatus of claim 30 wherein said sub-surface portion of said article includes a normally die locked portion of said article and said at least one wedge member is movable toward said unwedged position to free said normally die locked portion.

32. The apparatus of claim 30 wherein said sub-surface portion of said article comprises means for holding a preform within said cavity during injection molding such that said preform is partially embedded within said article after injection molding.

33. The apparatus of claim 30 wherein said sub-surface portion of said article comprises an injection molded portion of said article forming a normally die locked portion and said at least one wedge member is movable from the wedged position to the unwedged position to free the sub-surface die locked portion of said article.

34. The apparatus of claim 30, wherein said wedge member comprises a multi-piece wedge wherein a first portion of said multi-piece wedge is inserted and removed from one side of said injection mold and a second portion of said multi-piece wedge is engaged and disengaged from an opposite side of said injection mold.

35. The apparatus of claim 34 wherein said multi-piece wedge comprises a five piece wedge wherein said first portion includes a central post to hold two parts to be partially embedded within said injection molded article at a predetermined spaced distance from one another and said second portion includes a four-piece truncated pyramid shaped wedge assembly with a complimentary shaped central post receiving aperture and a T-shaped base for drawing the second portion out of engagement with the first portion when releasing said injection molded article from said multipiece mold.

36. The apparatus of claim 30 wherein said at least one wedge member comprises a multi-piece wedge engageable within said wedge-receiving aperture from a first side of said injection mold to receive said sub-surface portion of said article between separate portions of said multi-piece wedge.

37. The apparatus of claim 30 wherein said at least one wedge member comprises a one-piece wedge engageable within said wedge-receiving aperture from a first side of said injection mold to receive said sub-surface portion of said article between said one-piece wedge and a wall of said wedge-receiving aperture.

38. The apparatus of claim 30 further comprising:
said at least one wedge member having an L-shaped portion cooperating with said die member to form a close fitting aperture to receive said sub-surface portion of said preform.

* * * * *

UNITED STATES PATENT AND TRADEMARK OFFICE
CERTIFICATE OF CORRECTION

PATENT NO. : 5,073,326

DATED : December 17, 1991

INVENTOR(S) : R. Craves, et al.

It is certified that error appears in the above-identified patent and that said Letters Patent is hereby corrected as shown below:

Column 11, line 25, delete "driving" and insert --during--.

Column 13, line 31, before "wedge" insert --at least one--.

Column 14, line 6, delete "parts" and insert --preforms--.

Signed and Sealed this

Thirteenth Day of April, 1993

Attest:

STEPHEN G. KUNIN

*Attesting Officer*     *Acting Commissioner of Patents and Trademarks*